(12) United States Patent
Liu

(10) Patent No.: US 9,407,756 B2
(45) Date of Patent: Aug. 2, 2016

(54) NOTIFICATION ACKNOWLEDGEMENT IN ELECTRONIC DEVICES

(71) Applicant: Intel Corporation, Santa Clara, CA (US)

(72) Inventor: Min Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 14/040,646

(22) Filed: Sep. 28, 2013

(65) Prior Publication Data

US 2015/0094031 A1    Apr. 2, 2015

(51) Int. Cl.
*H04M 3/02* (2006.01)
*H04M 3/436* (2006.01)
*H04M 1/725* (2006.01)
*H04M 19/04* (2006.01)

(52) U.S. Cl.
CPC ............ *H04M 3/02* (2013.01); *H04M 1/72569* (2013.01); *H04M 3/436* (2013.01); *H04M 19/04* (2013.01); *H04M 2250/12* (2013.01); *H04M 2250/22* (2013.01)

(58) Field of Classification Search
CPC ................................ H04M 3/02; H04M 3/436
USPC ...................................................... 455/412.2
See application file for complete search history.

(56) References Cited

U.S. PATENT DOCUMENTS

| | | | |
|---|---|---|---|
| 2008/0081674 A1* | 4/2008 | Orr | H04M 19/044 455/567 |
| 2008/0165022 A1* | 7/2008 | Herz | G06F 3/017 340/669 |
| 2010/0029270 A1* | 2/2010 | Kiddie et al. | 455/428 |
| 2010/0245062 A1* | 9/2010 | Shuster | 340/407.1 |
| 2012/0315960 A1* | 12/2012 | Kim | H04W 52/0254 455/574 |
| 2012/0316406 A1* | 12/2012 | Rahman | G01C 22/006 600/301 |
| 2012/0327790 A1* | 12/2012 | Lee et al. | 370/252 |
| 2013/0044072 A1* | 2/2013 | Kobayashi | H04M 1/0237 345/173 |
| 2013/0260827 A1* | 10/2013 | Shuster | 455/556.1 |

FOREIGN PATENT DOCUMENTS

KR    1020120067411 A    6/2012

OTHER PUBLICATIONS

International Search Report and Written Opinion received for International Application No. PCT/US2014/056232, mailed on Dec. 8, 2014.
Hinckley, et al., "Toward More Sensitive Mobile Phones", Symposium on User Interface Software & Technology, 2001, 2 pages, Microsoft Research, Redmond, WA.

\* cited by examiner

*Primary Examiner* — Qun Shen
(74) *Attorney, Agent, or Firm* — Alpine Technology Law Group LLC

(57) ABSTRACT

In one example a controller comprises logic, at least partially including hardware logic, configured to receive a notification of an incoming event and terminate the notification in response to at least one of a predetermined motion applied to the controller or a predetermined touch applied to a touch surface. Other examples may be described.

16 Claims, 10 Drawing Sheets

NOTIFICATION ACKNOWLEDGEMENT IN ELECTRONIC DEVICES

RELATED APPLICATIONS

None.

BACKGROUND

The subject matter described herein relates generally to the field of electronic devices and more particularly to notification acknowledgment in electronic devices.

Electronic devices commonly receive notifications for events like incoming text or email messages, phone calls, calendar events, and the like. The notifications are delivered to the user through auditory (e.g., phone ringing), tactile (e.g., device vibration), visual (e.g., pop-up notice on the display), and/or other means. Using in-coming phone call as an example of the notifications, existing electronic devices commonly require a user to respond to the alert, e.g., by accepting or rejecting a phone call via a touch surface or buttons, in order to terminate the alert. The termination of the alert or acknowledgement of the notification (stopping the ringing, vibration, etc), happens at the same time as when the user decides to either accept or reject the incoming phone call. This delays the alert response process and sometimes creates disturbances in meetings, or other environment due to the fact that the user needs time first to investigate the reason of the notification and then to make a decision on how to respond (e.g., accept or reject) in order to stop the ringing (or other alert/notification). Or the user needs to globally disable the alert in the electronic device's settings menu, thereby unable to receive any alert when specified notifications occur. Neither of the existing solutions provides adequate and satisfactory experience to the device user. Accordingly additional systems and techniques to acknowledge notifications in electronic devices may find utility.

BRIEF DESCRIPTION OF THE DRAWINGS

The detailed description is described with reference to the accompanying figures.

DETAILED DESCRIPTION

Described herein are exemplary systems and methods to implement notification acknowledgment in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Figure 1:
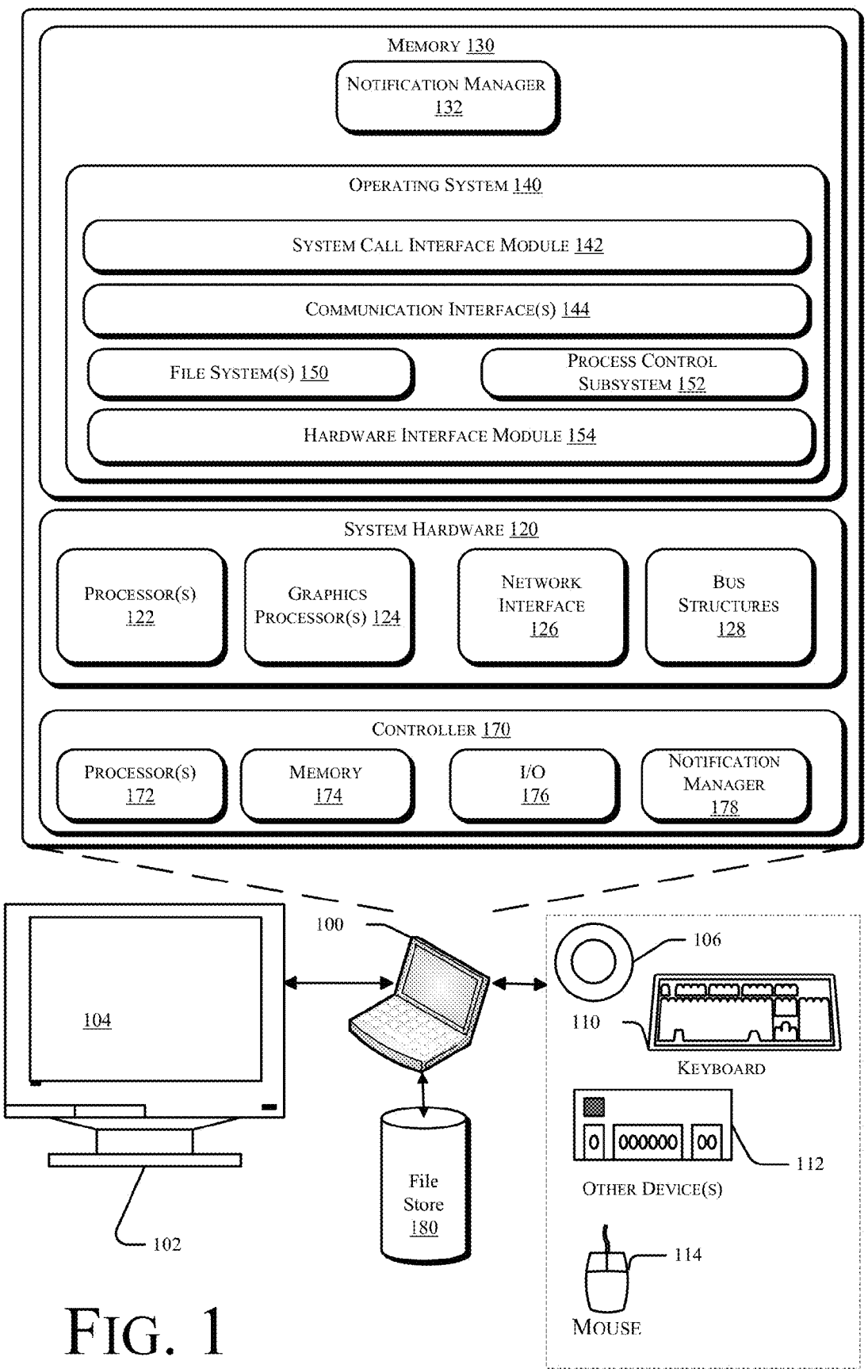
FIGS. 1-2 are schematic illustrations of exemplary electronic devices which may be adapted to implement notification acknowledgment in accordance with some examples.

FIG. 1 is a schematic illustration of an electronic device 100 which may be adapted to implement GNSS services on a low-power controller in accordance with some examples. In one example, electronic device 100 includes one or more accompanying input/output (I./O) devices including a display 102 having a screen 104, one or more speakers 106, a keyboard 110, one or more other I/O device(s) 112, and a mouse 114. The other I/O device(s) 112 may include a touch surface, a voice-activated input device, a track ball, and any/or other device that allows the electronic device 100 to receive input from a user.

In various examples, the electronic device 100 may be embodied as a personal computer, a laptop computer, a personal digital assistant, a mobile telephone, an entertainment device, or another computing device. The electronic device 100 includes system hardware 120 and memory 130, which may be implemented as random access memory and/or read-only memory. A file store 180 may be communicatively coupled to electronic device 100. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one example, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one example, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one example, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one example, operating system 140 includes a hardware interface module 154 that provides an interface to system hardware 120. In addition, operating system 140 may include a file system 150 that manages files used in the operation of computing device 108 and a process control subsystem 152 that manages processes executing on electronic device 100.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

Memory 130 may comprise one or more applications which execute on the processor(s) 122. The applications may be stored in permanent memory such as file store 180 when not in use by the electronic device 100. In use, the applications may be copied into memory 130 for execution. In the example depicted in FIG. 1 the applications comprise a notification manager 132.

In some examples electronic device 100 may comprise a low-power controller 170. The controller 170 may be implemented as an independent integrated circuit located on or coupled to the motherboard of the electronic device 100. In the example depicted in FIG. 1 the controller 170 comprises a processor 172, a memory 174, an I/O module 176 and a notification manager 178.

In some examples the memory module 174 may comprise a persistent flash memory module and the I/O module 176 may comprise a serial I/O module or a parallel I/O module. Because the controller 170 is physically separate from the system hardware 120 and operating system 140, the adjunct controller 170 can operate independently while the system hardware 120 remains in a low-power consumption state, e.g., a sleep state. Further, the low-power controller 170 may be secure in the sense that the low-power controller 170 is inaccessible to hacking through the operating system 140.

Figure 2:
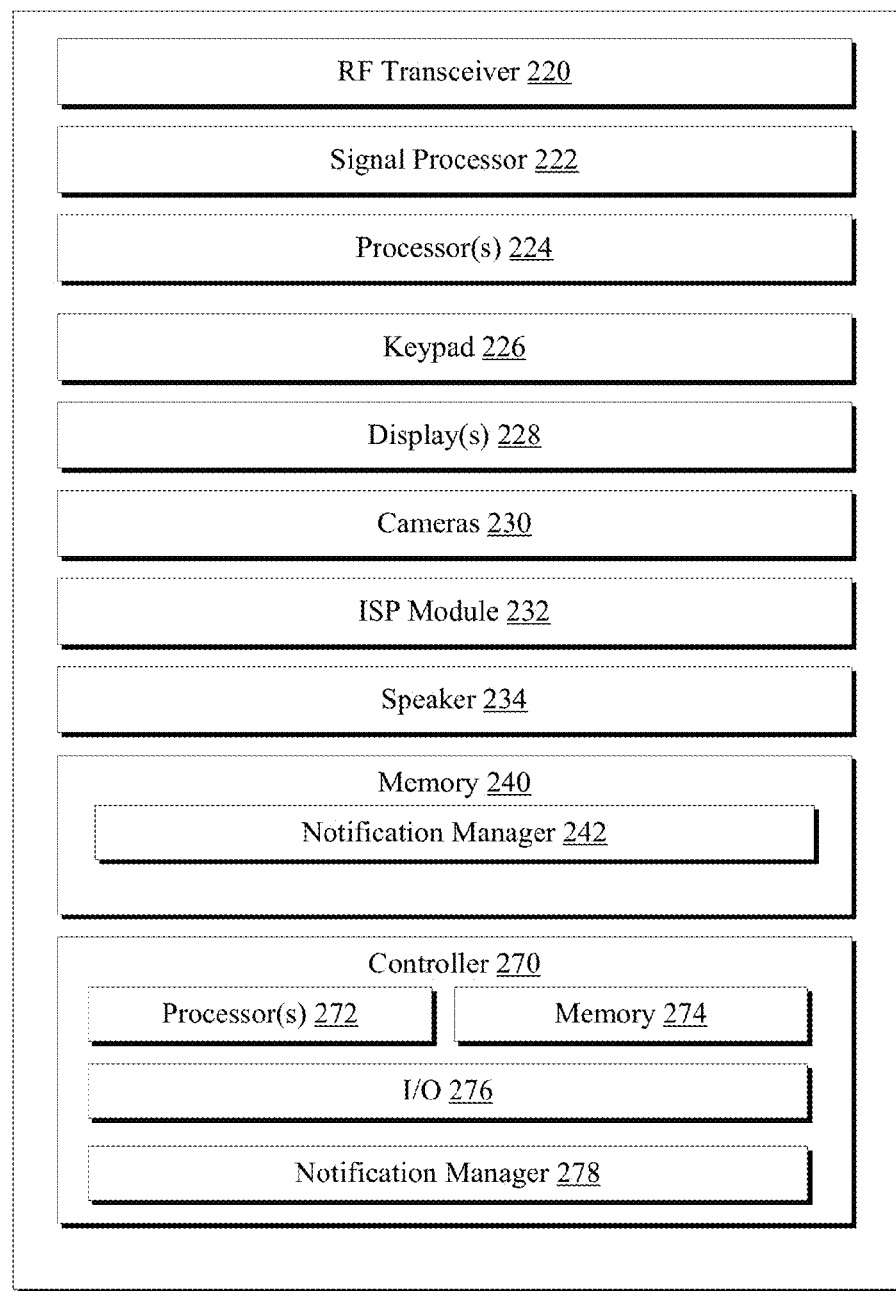

FIG. 2 is a schematic illustration of another example of an electronic device 200 which may be adapted to implement notification acknowledgment. In some aspects electronic device 200 may be embodied as a mobile telephone, a tablet computing device, a personal digital assistant (PDA), a notepad computer, a wearable device like a smart watch, smart wrist band, smart headphone, or the like. Electronic device 200 may include an RF transceiver 220 to transceive RF signals and a signal processing module 222 to process signals received by RF transceiver 220.

RF transceiver 220 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 200 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some examples, processor 224 may be one or more processors in the family of Intel® PXA27x processors available from Intel® Corporation of Santa Clara, Calif. Alternatively, other processors may be used, such as Intel's Itanium®, XEON™, ATOM™, and Celeron® processors. Also, one or more processors from other manufactures may be utilized. Moreover, the processors may have a single or multi core design.

In some examples, memory module 240 includes random access memory (RAM); however, memory module 240 may be implemented using other memory types such as dynamic RAM (DRAM), synchronous DRAM (SDRAM), and the like. Memory 240 may comprise one or more applications including a notification manager 242 which execute on the processor(s) 222.

Electronic device 200 may further include one or more input/output interfaces such as, e.g., a keypad 226 and one or more displays 228. In some examples electronic device 200 comprises one or more camera modules 230 and an image signal processor 232, and speakers 234.

In some examples electronic device 200 may include a low-power controller 270 which may be implemented in a manner analogous to that of controller 170, described above. In the example depicted in FIG. 2 the controller 270 comprises one or more processor(s) 272, a memory module 274, an I/O module 276, and a notification manager 278. In some examples the memory module 274 may comprise a persistent flash memory module and the authentication module 276 may be implemented as logic instructions encoded in the persistent memory module, e.g., firmware or software. The I/O module 276 may comprise a serial I/O module or a parallel I/O module. Again, because the adjunct controller 270 is physically separate from the main processor(s) 224, the adjunct controller 270 can operate independently while the processor(s) 224 remains in a low-power consumption state, e.g., a sleep state. Further, the low-power controller 270 may be secure in the sense that the low-power controller 270 is inaccessible to hacking through the operating system.

Figure 3:
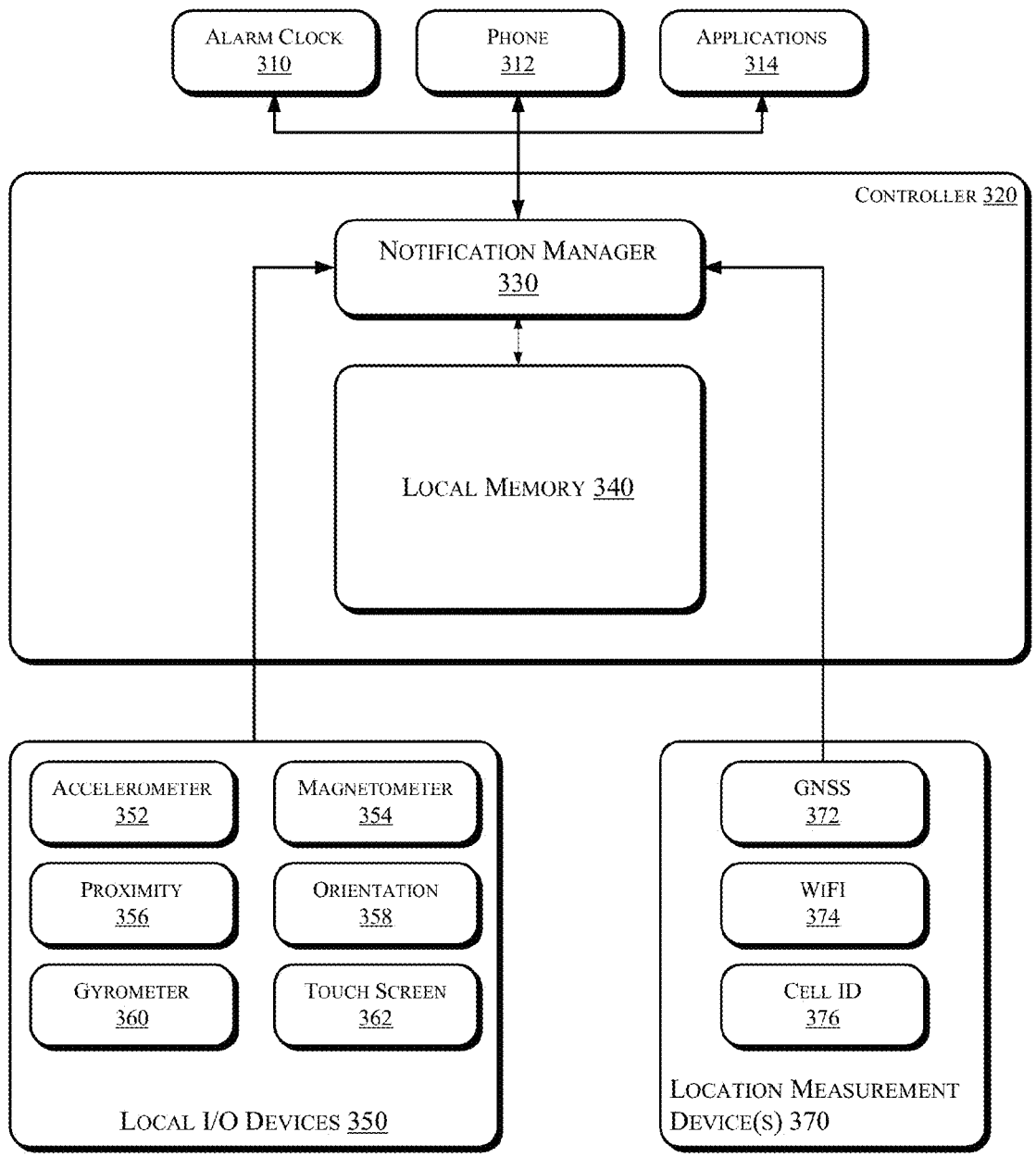
FIG. 3 is a high-level schematic illustration of an exemplary architecture to implement notification acknowledgment in accordance with some examples.

FIG. 3 is a high-level schematic illustration of an exemplary architecture 300 to implement notification acknowledgment in electronic devices. Referring to FIG. 3, a controller 320 may be embodied as general purpose processor such as processors 122 or 222 or as a low-power controller such as controllers 170 or 270. Controller 320 may comprise a notification manager 330 to manage notification services and a local memory 340. As described above, in some examples the notification manager 330 may be implemented as logic instructions executable on controller 320, e.g., as software or firmware, or may be reduced to hardwired logic circuits. Local memory 340 may be implemented using volatile and/or non-volatile memory.

Controller 320 may be communicatively coupled to one or more local devices input/output (I/O) devices 350 which provide signals that indicate whether an electronic device is in motion or other environmental conditions. For example, local I/O devices 350 may include an accelerometer 352, a magnetometer 358, a proximity detector 356, an orientation sensor 358, a gyrometer 360 or and a touch surface 362.

Controller 320 may also be communicatively coupled to one or more location measurement devices 370, which may include a GNSS device 372, a WiFi device 374 and a cellular network device 376. GNSS device 372 may generate location measurements using a satellite network such as the Global Positioning System (GPS) or the like. WiFi device 374 may generate location measurements based on a location of a WiFi network access point. Similarly, Cell ID device may generate location measurements base on a location of a cellular network access point.

Having described various structures of a system to implement notification acknowledgment in electronic devices, operating aspects of a system will be explained with reference to FIG. 4, which is a flow chart illustrating operations in a method to implement notification acknowledgment in electronic devices. The operations depicted in the flowchart of FIG. 4 may be implemented by the notification manager 330.

Figure 4:
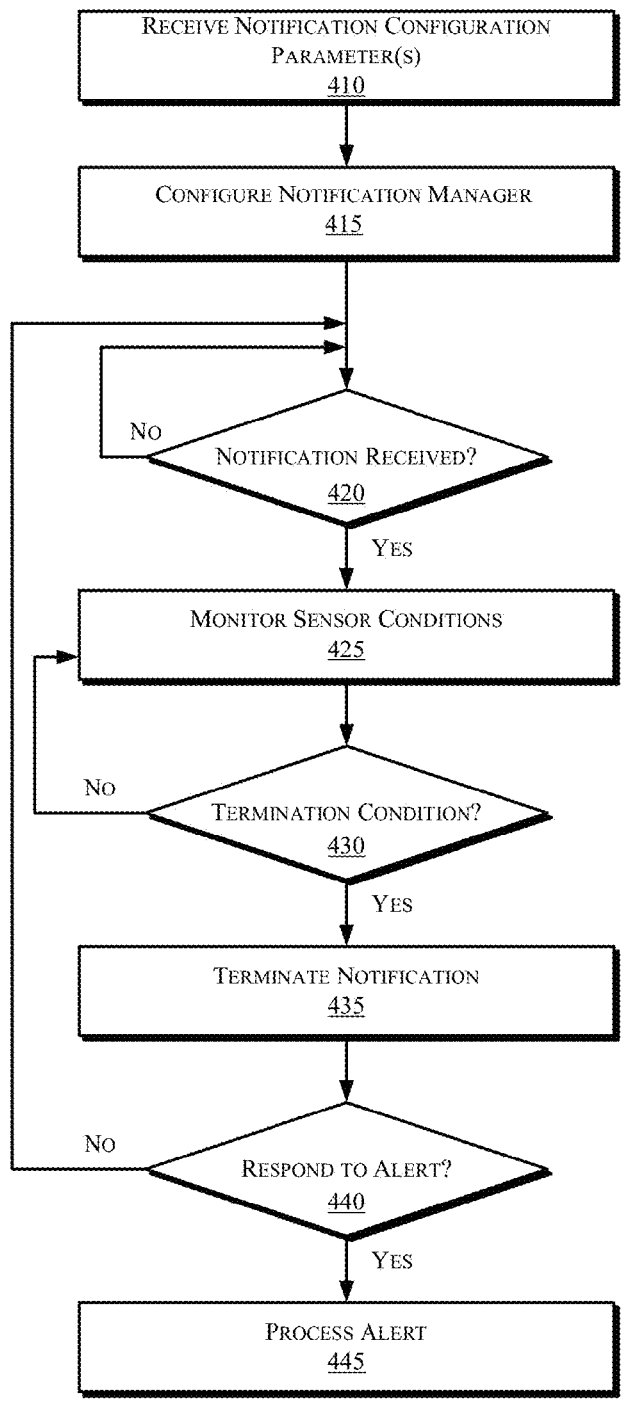
FIG. 4 is a flowchart illustrating operations in a method to implement notification acknowledgment in accordance with some examples.

Referring to FIG. 4, at operation 410 the notification manager 330 receives one or more notification configuration conditions. FIG. 4 is a flowchart illustrating operations implemented by notification manager 330 in an electronic device 300. Referring to FIG. 4, at operation 410 the notification manager 330 receives one or more notification configuration conditions. In some examples the notification manager 330 may present an interactive user interface, such as the user interface 500 depicted in FIG. 5, through which a user may enter one or more acknowledgment notification configuration conditions.

For example, the configuration conditions may include a pick up from stationary surface condition 520 which allows a user to terminate a notification by picking up a device which has been stationary for a period of time. If the pick up from stationary surface parameter is set to ON then the notification manager 330 may be terminate a notification in response to picking up the device from a stationary surface. By contrast, if pick up from stationary surface is set to OFF then picking up the device from a stationary surface does not turn off the termination.

The configuration conditions may further include a shake device condition 530 which allows a user to terminate a notification by shaking a device. If the shake device condition is set to ON then the notification manager 330 may terminate a notification in response to shaking the device. By contrast, if the shake device condition is set to OFF then shaking the device will not trigger a notification termination condition.

The configuration conditions may further include a tap device condition 540 which allows a user to terminate a notification by tapping a device. If the shake device condition is set to ON then the notification manager 330 may terminate a notification in response to tapping the device from. By contrast, if the shake device condition is set to OFF then tapping the device will not trigger a notification termination condition.

The configuration conditions may further include a proximity change condition 530 which allows a user to terminate a notification by moving an object within a predetermined proximity of a device. If the proximity change condition is set to ON then the notification manager 330 may terminate a notification in response to an object moving within a predetermined distance of the device. By contrast, if the proximity change condition is set to OFF then moving an object within a predetermined distance of the device will not trigger a notification termination condition The configuration parameters may further include a customized gesture condition 550 which allows a user to define a predetermined motion which, when detected by the accelerometer 352 and/or gyrometer 360 will function as a notification termination condition. For example, a user may select a predetermined motion such as a shake or other particular motion. The user may move the controller through the preselected motion and the outputs of the accelerometer 352 and/or gyrometer 360 may be recorded in a memory such as memory 330. Subsequently, if the motion sensor parameter is selected a user may repeat the shake or other particular motion. The notification manager may compare the signals generated when the user repeats the shake or other particular motion with the signal generated during the configuration process. If the signals are sufficiently close then a notification termination condition may be triggered. By contrast, if the customized gesture condition is set to OFF then the motion will not trigger a termination condition.

The configuration parameters may further include a location parameter 570 which allows a user to select whether the notification manager 330 should be turned off at a particular location, e.g., at home or at work. If the location parameter is set to ON then the notification manager 330 may be turned off when input from one of the location measurement devices 370 indicates that the controller is at a specified location. By contrast, if the location parameter is set to OFF then there are no location limitations enforced.

In various examples the illumination manager may allow a user to enter more or fewer configuration parameters via the user interface 500. Once entered, the configuration parameters are used to configure (operation 415) the notification manager 330.

Referring back to FIG. 4, in some examples the notification manager 330 monitors for incoming notifications from, e.g., phone calls, incoming messages, calendar events, or other applications. If, at operation 420, there are no incoming notifications then the notification manager 330 continues to monitor for notifications. By contrast, if at operation 420 a notification is received then control passes to operation 425 and the notification manager monitors the sensor conditions from the various sensors depicted in FIG. 3.

Figure 5:
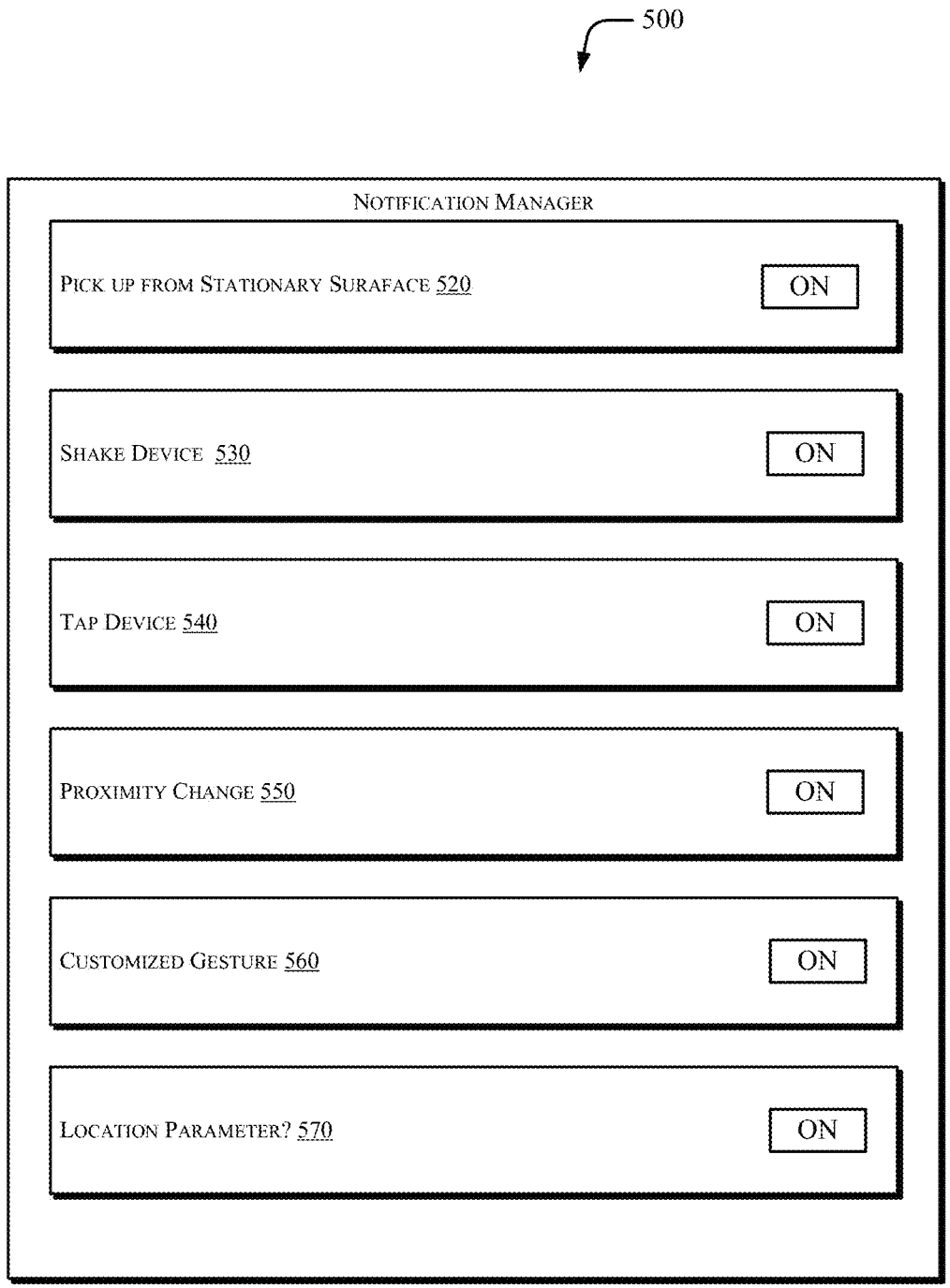
FIG. 5 is a schematic block diagram of notification termination conditions in accordance with some examples.

If, at operation 430, the outputs from the sensors indicate that one or more termination conditions are not met then control passes back to operation 425 and the notification manager 330 continues to monitor the sensors. By contrast, if at operation 430 one or more termination conditions are met then control passes to operation 435 and the notification manager 330 terminates the notification. For example, termination conditions may include those termination conditions defined via configuring the notification manger as illustrated in FIG. 5. Further, a responding to the alert, e.g., by answering a phone call, functions as a termination condition. In response to a termination condition the notification manager may mute an audible alert or terminate the vibration of a vibrating alert.

If, at operation 440, the user elects not to respond to the alert then control passes back to operation 420 and the notification manager 330 continues to monitor for additional notifications. By contrast, if at operation 440 the user elects to respond to the alert then control passes to operation 445 and the alert is processed.

The operations depicted in FIG. 4 enable notification manager 330 to define various parameters which may be used as termination conditions, then to monitor for incoming notifications and to terminate the notifications in response to detecting one or more termination conditions. Thus, the controller separates the acknowledgment of a notification from the decision of whether to respond to a notification.

Figure 6:
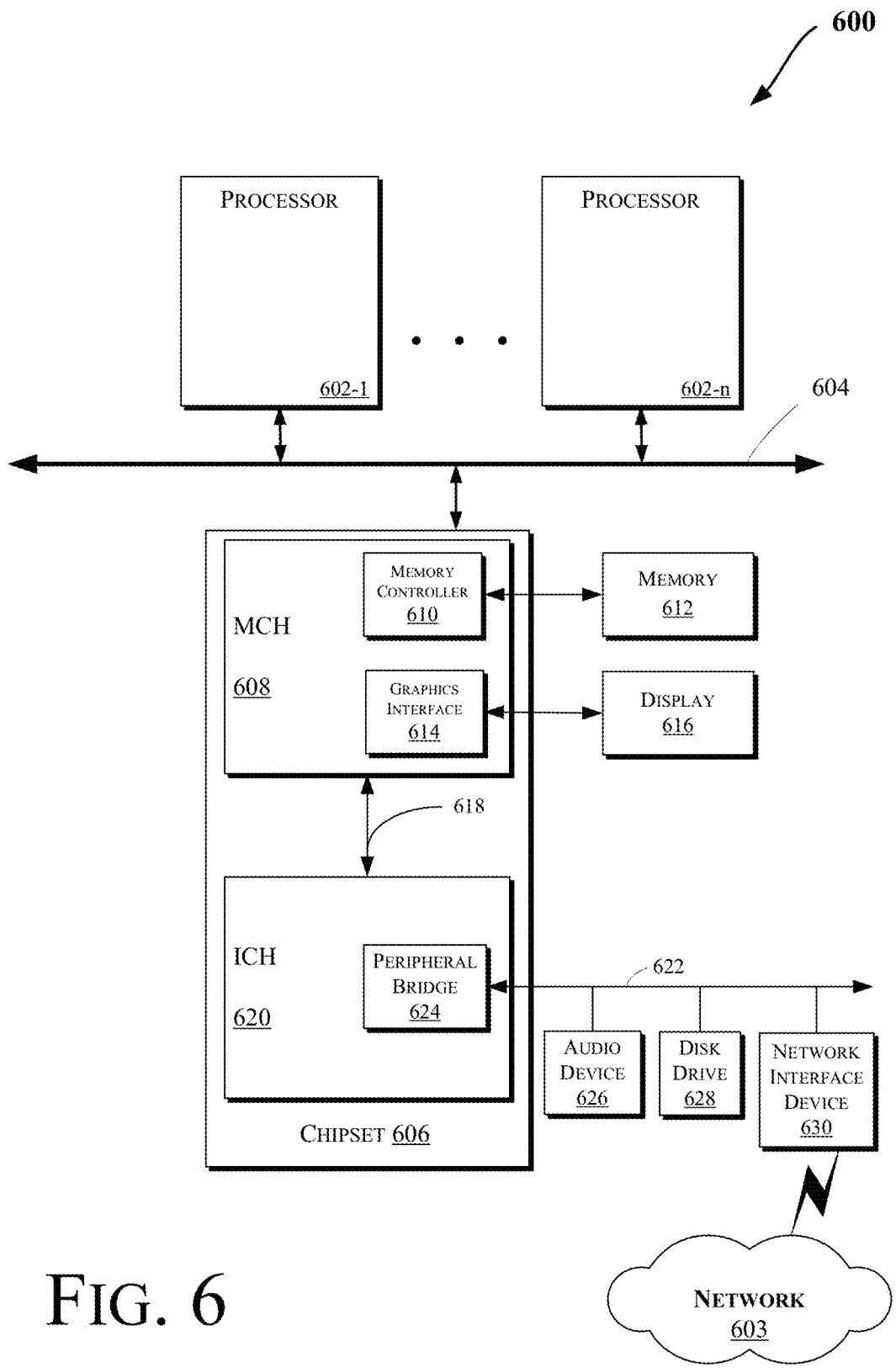
FIGS. 6-10 are schematic illustrations of electronic devices which may be adapted to implement notification acknowledgment in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
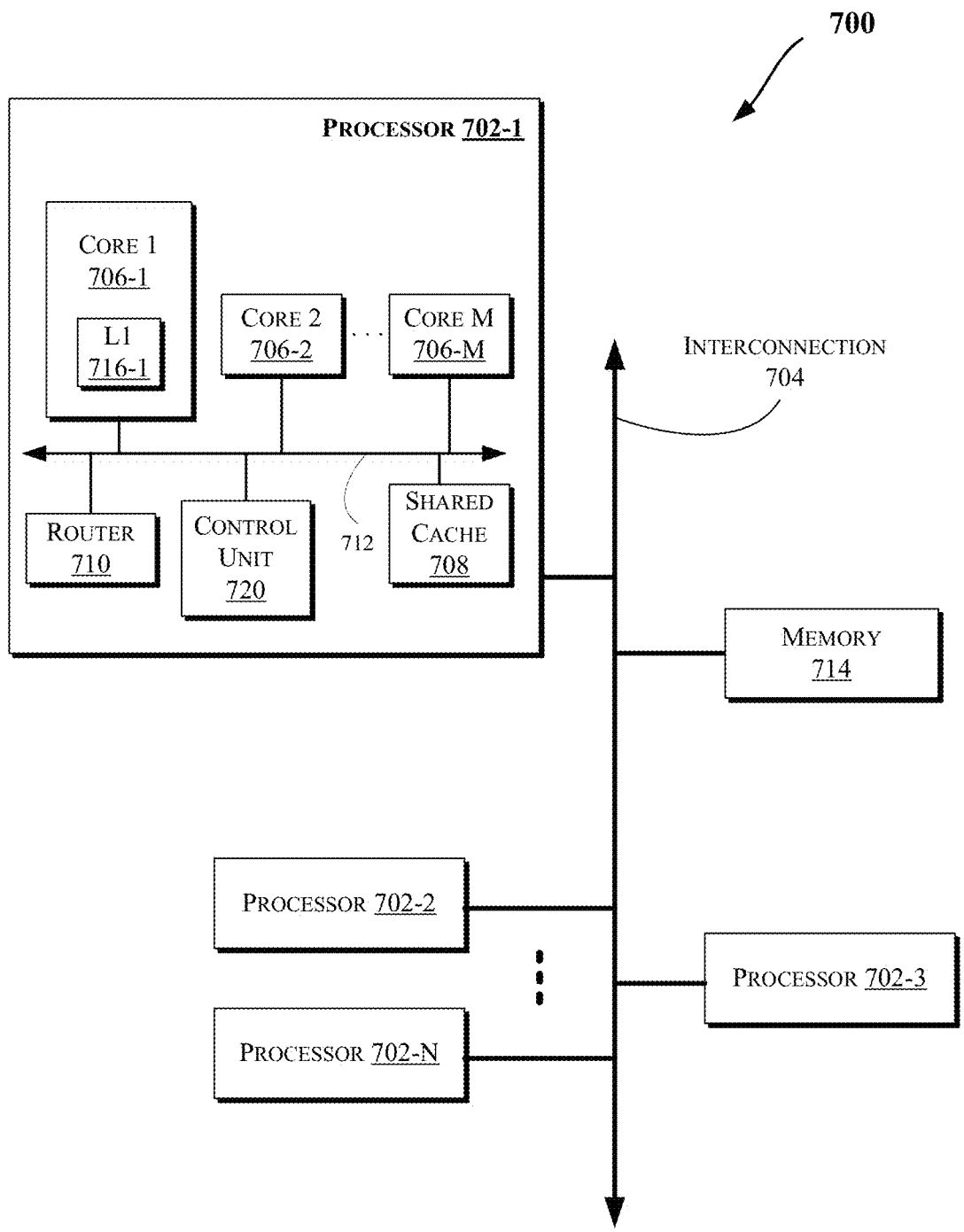

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
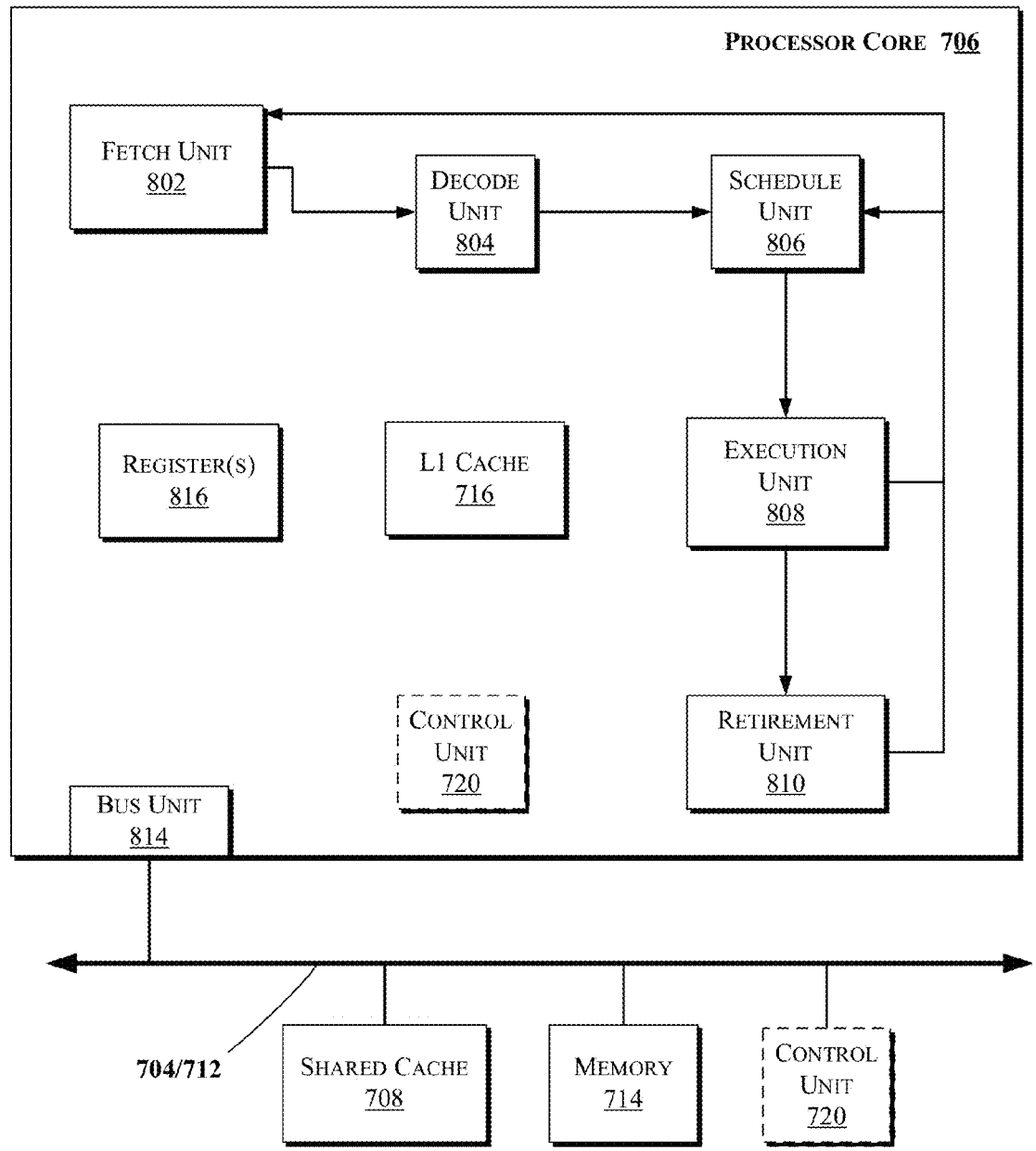

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
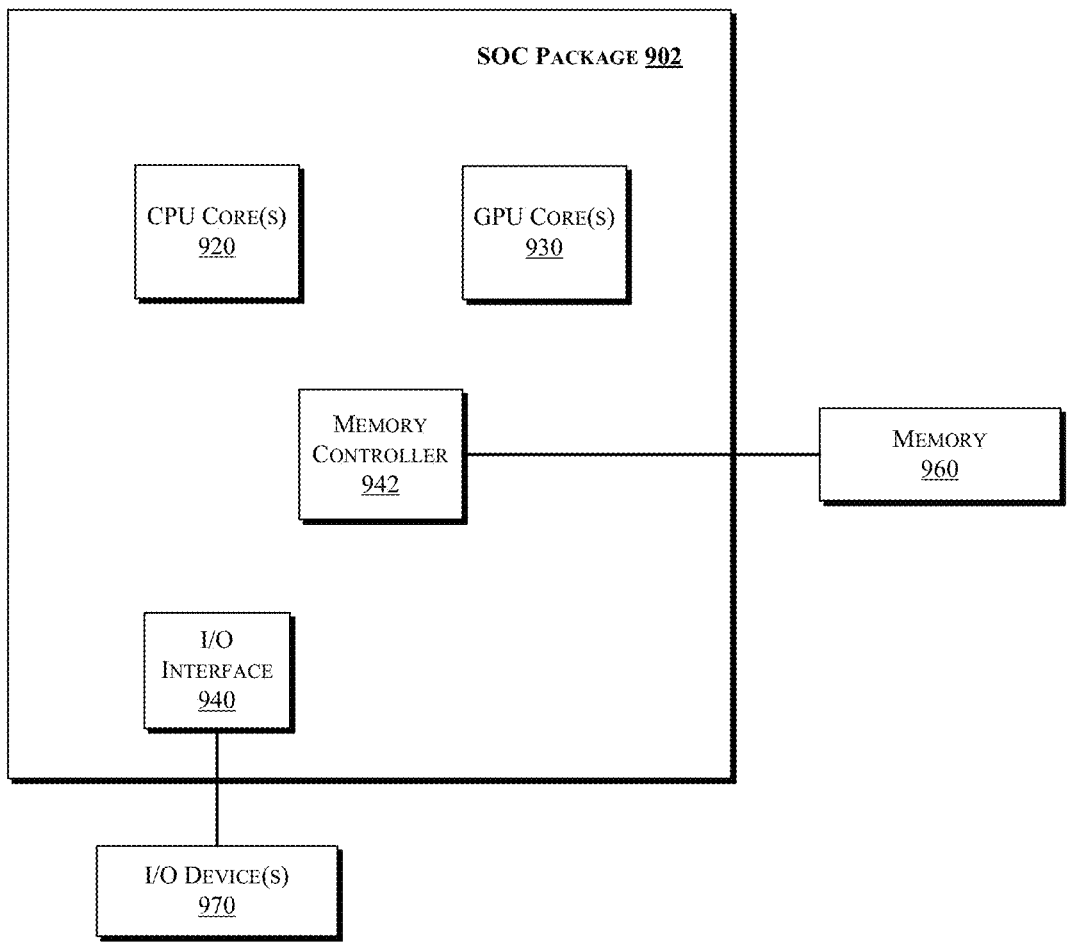

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
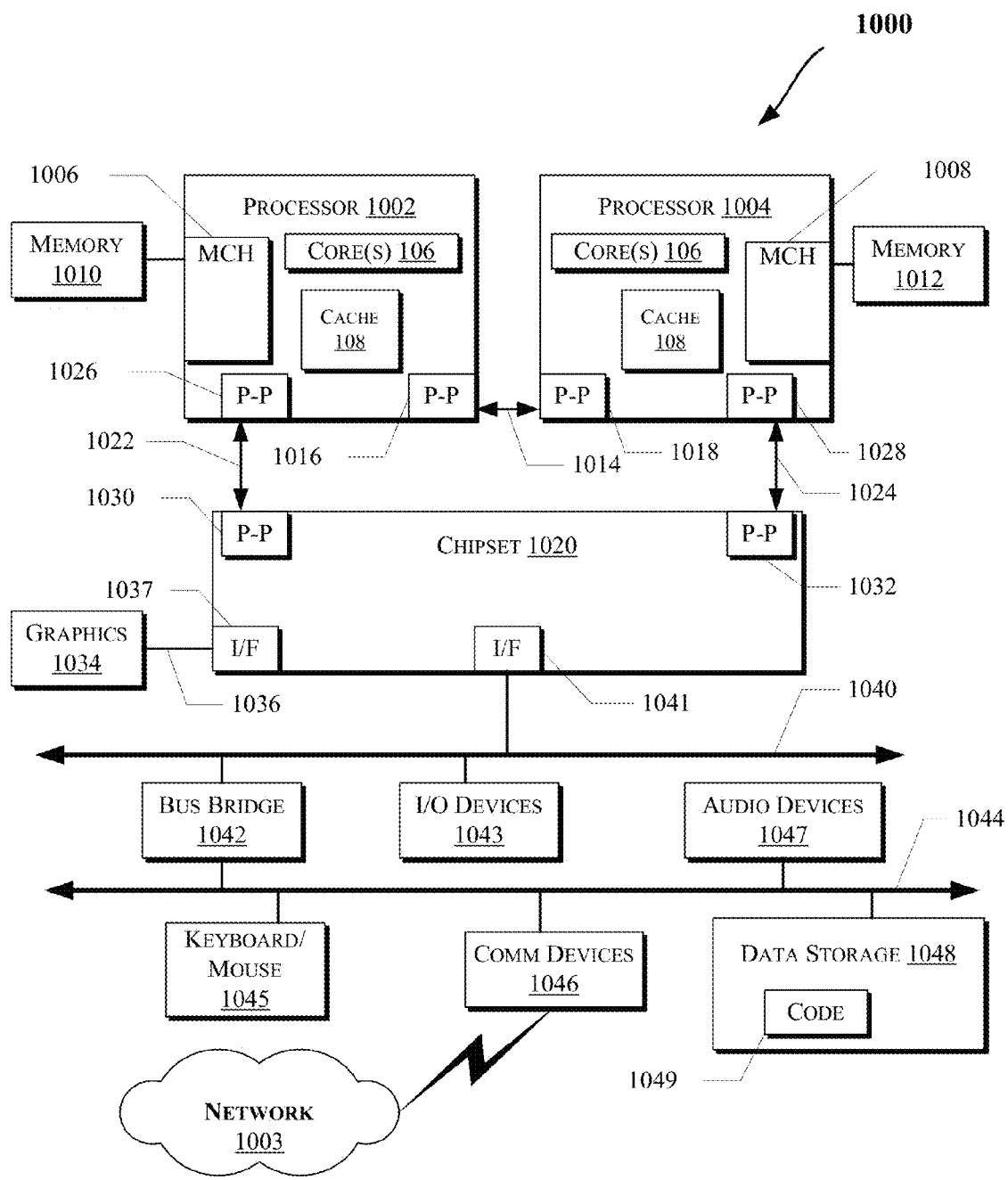

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a controller comprising logic, at least partially including hardware logic, configured to receive a notification of an incoming event, and terminate the notification in response to at least one of a predetermined motion applied to the controller or a predetermined touch applied to a touch surface.

In Example 2, the subject matter of Example 1 can optionally include an arrangement in which the notification comprises an alert from at least one of a phone call, an incoming message, a calendaring event, or an application.

In Example 3, the subject matter of any one of Examples 1-2 can optionally include logic further configured to receive an input from at least one of an accelerometer, a magnetometer, a proximity detector, an orientation detector, a gyrometer, a touch surface, a global navigation satellite system (GNSS) device, a WiFi device. or a cellular network access device.

In Example 4, the subject matter of any one of Examples 1-3 can optionally include logic further configured to receive a termination condition during a configuration process, and determine whether a termination condition received in response to the notification matches the termination condition received during the configuration process.

In Example 5, the subject matter of any one of Examples 1-4 can optionally include logic further configured to terminate the notification comprises logic to terminate at least one of an audible alert, or a vibrating alert.

In Example 6, the subject matter of any one of Examples 1-5 can optionally include logic further configured to respond to the alert in response to at least one of a predetermined motion applied to the controller or a predetermined touch applied to a touch surface.

Example 7 is a computer program product comprising logic instructions stored in a non-transitory computer readable medium which, when executed by a controller, configure the controller to receive a notification of an incoming event and terminate the notification in response to at least one of a predetermined motion applied to the controller, or a predetermined touch applied to a touch surface.

In Example 8, the subject matter of Example 7 can optionally include an arrangement in which the notification comprises an alert from at least one of a phone call, an incoming message, a calendaring event, or an application.

In Example 9, the subject matter of any one of Examples 7-8 can optionally include logic further configured to receive an input from at least one of an accelerometer, a magnetometer, a proximity detector, an orientation detector, a gyrometer, a touch surface, a global navigation satellite system (GNSS) device, a WiFi device. or a cellular network access device.

In Example 10, the subject matter of any one of Examples 7-9 can optionally include logic further configured to receive a termination condition during a configuration process, and determine whether a termination condition received in response to the notification matches the termination condition received during the configuration process.

In Example 11, the subject matter of any one of Examples 7-10 can optionally include logic further configured to terminate the notification comprises logic to terminate at least one of an audible alert, or a vibrating alert.

In Example 12, the subject matter of any one of Examples 7-11 can optionally include logic further configured to respond to the alert in response to at least one of a predetermined motion applied to the controller or a predetermined touch applied to a touch surface.

Example 13 is an electronic device, comprising a processor and a controller, comprising logic, at least partially including hardware logic, configured to receive a notification of an incoming event and terminate the notification in response to at least one of a predetermined motion applied to the controller, or a predetermined touch applied to a touch surface.

In Example 14, the subject matter of Example 13 can optionally include an arrangement in which the notification comprises an alert from at least one of a phone call, an incoming message, a calendaring event, or an application.

In Example 15, the subject matter of any one of Examples 13-14 can optionally include logic further configured to receive an input from at least one of an accelerometer, a magnetometer, a proximity detector, an orientation detector, a gyrometer, a touch surface, a global navigation satellite system (GNSS) device, a WiFi device. or a cellular network access device.

In Example 16, the subject matter of any one of Examples 13-15 can optionally include logic further configured to receive a termination condition during a configuration process, and determine whether a termination condition received in response to the notification matches the termination condition received during the configuration process.

In Example 17, the subject matter of any one of Examples 13-16 can optionally include logic further configured to terminate the notification comprises logic to terminate at least one of an audible alert, or a vibrating alert.

In Example 18, the subject matter of any one of Examples 13-17 can optionally include logic further configured to respond to the alert in response to at least one of a predetermined motion applied to the controller or a predetermined touch applied to a touch surface.

Example 19 is a method, comprising receiving, in a controller, a notification of an incoming event and terminating the notification in response to at least one of a predetermined motion applied to the controller or a predetermined touch applied to a touch surface.

In Example 20, the subject matter of Example 13 can optionally include an arrangement in which the notification comprises an alert from at least one of a phone call, an incoming message, a calendaring event, or an application.

In Example 21, the subject matter of any one of Examples 19-20 can optionally include logic further configured to receive an input from at least one of an accelerometer, a magnetometer, a proximity detector, an orientation detector, a gyrometer, a touch surface, a global navigation satellite system (GNSS) device, a WiFi device. or a cellular network access device.

In Example 22, the subject matter of any one of Examples 19-21 can optionally include receiving a termination condition during a configuration process, and determining whether a termination condition received in response to the notification matches the termination condition received during the configuration process.

In Example 23, the subject matter of any one of Examples 19-22 can optionally include terminating at least one of an audible alert, or a vibrating alert.

In Example 24, the subject matter of any one of Examples 19-23 can optionally include logic further configured to respond to the alert in response to at least one of a predetermined motion applied to the controller or a predetermined touch applied to a touch surface.

Example 25 is an electronic device, comprising a processor and means for receiving a notification of an incoming event and means for terminating the notification in response to at least one of a predetermined motion applied to the controller or a predetermined touch applied to a touch surface.

In Example 26, the subject matter of Example 25 can optionally include an arrangement in which the notification comprises an alert from at least one of a phone call, an incoming message, a calendaring event, or an application.

In Example 27, the subject matter of any one of Examples 25-26 can optionally include logic further configured to receive an input from at least one of an accelerometer, a magnetometer, a proximity detector, an orientation detector, a gyrometer, a touch surface, a global navigation satellite system (GNSS) device, a WiFi device, or a cellular network access device.

In Example 28, the subject matter of any one of Examples 25-27 can optionally include logic further configured to receive a termination condition during a configuration process, and determine whether a termination condition received in response to the notification matches the termination condition received during the configuration process.

In Example 29, the subject matter of any one of Examples 25-28 can optionally include logic further configured to terminate the notification comprises logic to terminate at least one of an audible alert, or a vibrating alert.

In Example 30, the subject matter of any one of Examples 25-29 can optionally include logic further configured to respond to the alert in response to at least one of a predetermined motion applied to the controller or a predetermined touch applied to a touch surface.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
   logic, at least partially including hardware logic, configured to:
      receive one or more notification configuration conditions via an interactive user interface communicatively coupled to the controller;
      use the one or more notification configuration conditions to configure a notification manager;
      record, in a memory, a first output signal of at least one of an accelerometer or a gyrometer as the controller is moved through a preselected motion;
      receive a notification of an incoming event;
      receive a second output signal of the at least one of the accelerometer or the gyrometer in response to a subsequent motion;
      compare the second output signal to the first output signal; and
      terminate the notification when the second output signal matches the first output signal.

2. The controller of claim 1, further comprising logic to:
   detect that the controller has been picked up from a stationary surface; and
   in response thereto, to terminate the notification.

3. The controller of claim 1, further comprising logic to:
   detect that the controller has been shaken; and
   in response thereto, to terminate the notification.

4. The controller of claim 1, further comprising logic to:
   detect that the controller has moved within a predetermined distance of an object; and
   in response thereto, to terminate the notification.

5. A computer program product comprising logic instructions stored in a non-transitory computer readable medium which, when executed by a controller, configure the controller to:
   receive one or more notification configuration conditions via an interactive user interface communicatively coupled to the controller;
   use the one or more notification configuration conditions to configure a notification manager;
   record, in a memory, a first output signal of at least one of an accelerometer or a gyrometer as the controller is moved through a preselected motion;

receive a notification of an incoming event;
receive a second output signal of the at least one of the accelerometer or the gyrometer in response to a subsequent motion;
compare the second output signal to the first output signal; and
terminate the notification when the second output signal matches the first output signal.

6. The computer program product of claim 5, further comprising logic instructions stored in a non-transitory computer readable medium which, when executed by a controller, configure the controller to:
detect that the controller has been picked up from a stationary surface; and
in response thereto, to terminate the notification.

7. The computer program product of claim 5, further comprising logic instructions stored in a non-transitory computer readable medium which, when executed by a controller, configure the controller to:
detect that the controller has been shaken; and
in response thereto, to terminate the notification.

8. The controller of claim 5, further comprising logic instructions stored in a non-transitory computer readable medium which, when executed by a controller, configure the controller to:
detect that the controller has moved within a predetermined distance of an object; and
in response thereto, to terminate the notification.

9. An electronic device, comprising:
a processor; and
a controller, comprising:
logic, at least partially including hardware logic, configured to:
receive one or more notification configuration conditions via an interactive user interface communicatively coupled to the controller;
use the one or more notification configuration conditions to configure a notification manager;
record, in a memory, a first output signal of at least one of an accelerometer or a gyrometer as the controller is moved through a preselected motion;
receive a notification of an incoming event;
receive a second output signal of the at least one of the accelerometer or the gyrometer in response to a subsequent motion;
compare the second output signal to the first output signal; and
terminate the notification when the second output signal matches the first output signal.

10. The electronic device of claim 9, wherein the logic is further configured to:
detect that the controller has been picked up from a stationary surface; and
in response thereto, to terminate the notification.

11. The electronic device of claim 9, wherein the logic is further configured to:
detect that the controller has been shaken; and
in response thereto, to terminate the notification.

12. The electronic device of claim 9, wherein the logic is further configured to:
detect that the controller has moved within a predetermined distance of an object; and
in response thereto, to terminate the notification.

13. A method, comprising:
receiving one or more notification configuration conditions via an interactive user interface communicatively coupled to the controller;
using the one or more notification configuration conditions to configure a notification manager;
recording, in a memory, a first output signal of at least one of an accelerometer or a gyrometer as the controller is moved through a preselected motion
receiving, in a controller, a notification of an incoming event;
receiving a second output signal of the at least one of the accelerometer or the gyrometer in response to a subsequent motion;
comparing the second output signal to the first output signal; and
terminating the notification when the second output signal matches the first output signal.

14. The method of claim 13, further comprising:
detecting that the controller has been picked up from a stationary surface; and
in response thereto, terminating the notification.

15. The method of claim 13, further comprising:
detecting that the controller has been shaken; and
in response thereto, terminating the notification.

16. The method of claim 13, further comprising:
detecting that the controller has moved within a predetermined distance of an object; and
in response thereto, terminating the notification.

* * * * *